(12) United States Patent
Onodera

(10) Patent No.: US 9,707,625 B2
(45) Date of Patent: Jul. 18, 2017

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventor: Chie Onodera, Omihachiman (JP)

(73) Assignee: KYOCERA CORPORATION, Kyoto-Shi, Kyoto (JP)

(*) Notice: Subject to any disclaimer, the term of this patent is extended or adjusted under 35 U.S.C. 154(b) by 5 days.

(21) Appl. No.: 14/381,726

(22) PCT Filed: Feb. 8, 2013

(86) PCT No.: PCT/JP2013/053073
§ 371 (c)(1),
(2) Date: Aug. 28, 2014

(87) PCT Pub. No.: WO2013/129083
PCT Pub. Date: Sep. 6, 2013

(65) Prior Publication Data
US 2015/0075338 A1 Mar. 19, 2015

(30) Foreign Application Priority Data

Feb. 29, 2012 (JP) .................. 2012-042889
Mar. 30, 2012 (JP) .................. 2012-079342

(51) Int. Cl.
*B23B 27/16* (2006.01)
*B23B 27/14* (2006.01)
*B23B 27/22* (2006.01)

(52) U.S. Cl.
CPC ........ *B23B 27/1607* (2013.01); *B23B 27/143* (2013.01); *B23B 27/22* (2013.01);
(Continued)

(58) Field of Classification Search
CPC .......... B23B 2200/32; B23B 2200/321; B23B 2200/323; B23B 27/1618; B23B 27/1637;
(Continued)

(56) References Cited

U.S. PATENT DOCUMENTS 4,941,780 A * 7/1990 Takahashi ............. B23B 27/143
407/114
5,282,703 A * 2/1994 Itaba ..................... B23B 27/143
407/114
(Continued)

FOREIGN PATENT DOCUMENTS

AT WO 2015081353 A1 * 6/2015 ......... B23B 27/1618
DE 4314570 A1 * 11/1994 ........... B23B 27/143
(Continued)

OTHER PUBLICATIONS

International Search Report, PCT/JP2013/053073, Apr. 22, 2013, 4 pgs.
(Continued)

*Primary Examiner* — Sunil K Singh
*Assistant Examiner* — Donte Brown
(74) *Attorney, Agent, or Firm* — Volpe and Koenig, P.C.

(57) ABSTRACT

A cutting insert according to one aspect of the present invention includes a polygonal columnar shape, and includes an upper surface, a lower surface and a side surface located between the upper surface and the lower surface, and a cutting edge is formed at an intersecting portion between the upper surface and the side surface, the upper surface includes a main portion of a convex shape including a flat upper end surface, a first projecting portion which projects from the main portion to a corner portion of the upper surface, and a pair of second projecting portions which each project from the first projecting portion to a periphery of the upper surface to interpose a region between a front end of
(Continued)

the first projecting portion and the corner portion, and each of upper ends of the pair of second projecting portions is spaced part from the first projecting portion.

18 Claims, 7 Drawing Sheets

(52) U.S. Cl.
CPC ... *B23B 2200/081* (2013.01); *B23B 2200/201* (2013.01); *B23B 2200/321* (2013.01); *Y10T 82/10* (2015.01); *Y10T 407/2268* (2015.01); *Y10T 407/235* (2015.01)

(58) Field of Classification Search
CPC .............. B23B 27/1648; Y10T 407/24; Y10T 407/245; Y10T 407/235
See application file for complete search history.

(56) References Cited

U.S. PATENT DOCUMENTS

| | | | | |
|---|---|---|---|---|
| 5,476,346 | A * | 12/1995 | Lundstrom | B23B 27/143 407/114 |
| 5,577,867 | A * | 11/1996 | Paya | B23B 27/141 407/114 |
| 5,725,334 | A * | 3/1998 | Paya | B23B 27/045 407/104 |
| 5,743,681 | A * | 4/1998 | Wiman | B23B 27/143 407/114 |
| 5,758,994 | A * | 6/1998 | Hintze | B23B 27/141 407/113 |
| 5,779,401 | A * | 7/1998 | Stallwitz | B23B 27/045 407/11 |
| 5,839,857 | A * | 11/1998 | Paya | B23B 27/141 407/114 |
| 5,921,722 | A * | 7/1999 | Paya | B23B 27/143 407/113 |
| 5,951,215 | A * | 9/1999 | Paya | B23B 27/141 407/113 |
| 7,121,772 | B2 * | 10/2006 | Krahula | B23B 27/143 407/113 |
| 7,182,555 | B2 * | 2/2007 | Kitagawa | B23B 27/141 407/113 |
| 7,367,755 | B2 * | 5/2008 | Wurfels | B23B 27/1618 407/113 |
| 7,621,700 | B2 * | 11/2009 | Jonsson | B23B 27/10 407/114 |
| 8,025,465 | B2 * | 9/2011 | Ishida | B23C 5/06 407/113 |
| 8,262,324 | B2 * | 9/2012 | Park | B23B 27/141 407/113 |
| 8,616,810 | B2 * | 12/2013 | Kaufmann | B23B 27/143 407/114 |
| 8,876,441 | B2 * | 11/2014 | Majima | B23B 27/143 407/113 |
| 8,967,920 | B2 * | 3/2015 | Krishtul | B23B 27/143 407/113 |
| 8,997,610 | B2 * | 4/2015 | Ishida | B23C 5/06 407/113 |
| 9,120,153 | B2 * | 9/2015 | Park | B23B 27/141 |
| 2008/0219784 | A1 * | 9/2008 | Yamazaki | B23B 27/143 407/114 |
| 2009/0226269 | A1 * | 9/2009 | Iyori | B23B 27/143 407/114 |
| 2011/0142555 | A1 | 6/2011 | Yamazaki et al. | |
| 2011/0299944 | A1 * | 12/2011 | Hofermann | B23B 27/10 407/11 |
| 2012/0275869 | A1 | 11/2012 | Yamazaki et al. | |
| 2013/0236258 | A1 * | 9/2013 | Nada | B23B 27/141 407/114 |
| 2015/0023744 | A1 * | 1/2015 | Wu | B23B 27/143 407/116 |

FOREIGN PATENT DOCUMENTS

| | | | | |
|---|---|---|---|---|
| DE | WO 9425208 A1 * | 11/1994 | | ........... B23B 27/143 |
| DE | 4336055 A1 * | 3/1995 | | ........... B23B 27/045 |
| DE | WO 2011038433 A1 * | 4/2011 | | ........... B23B 27/143 |
| EP | 1967304 A2 | 9/2008 | | |
| EP | 2322301 A1 | 5/2011 | | |
| JP | 2007-301669 A | 11/2007 | | |
| JP | 2007301669 A * | 11/2007 | | ............ B23B 27/22 |
| JP | 2008-213122 A | 9/2008 | | |
| JP | 2009-208216 A | 9/2009 | | |
| JP | 2010-69614 A | 4/2010 | | |
| JP | 2010069614 A * | 4/2010 | | ............ B23B 27/22 |
| JP | EP 2322301 A1 * | 5/2011 | | ........... B23B 27/143 |

OTHER PUBLICATIONS

Chinese Office Action with English concise explanation, Chinese Patent Application No. 201380011226.5, Sep. 30, 2015, 11 pgs.
Li, Shaoyong Bing, et al., "Metalworking Practice," Beijing Institute of Technology Press, 2011.1, pp. 39-41, with English Translation of p. 40, Paragraph 2-11.

* cited by examiner

US 9,707,625 B2

CUTTING INSERT, CUTTING TOOL, AND METHOD OF MANUFACTURING MACHINED PRODUCT

TECHNICAL FIELD

The present invention relates to a cutting insert, a cutting tool, and a method of manufacturing a machined product.

BACKGROUND ART

Conventionally, a throw-away cutting tool with a cutting insert attached to a holder is used for a cutting tool for use in cutting process. Such a cutting insert used for this cutting tool is generally configured to include an upper surface, a lower surface and a side surface, and a cutting edge is formed at an intersecting portion between the upper surface and the side surface. By bringing the cutting edge into contact with a rotating workpiece such as a metal member, it is possible to cut a workpiece.

A configuration of a cutting insert is proposed such that projections to be in contact with chips of a workpiece are provided on an upper surface thereof in the same manner as cutting chips disclosed in Patent Document 1. The cutting insert disclosed in Patent Document 1 can curve a chip by placing the chip of a workpiece in contact with a first projection (first ridge) and a second projection (second ridge) extending from the first projection.

The cutting insert disclosed in Patent Document 1 first contacts with the chip in the second projection upon high depth cut process. Further, after getting on the second projection, the chip contacts the first projection. At this time, an upper end of the second projection is positioned in contact with the first projection. Thus, when moving from the top of the second projection to the top of the first projection, the chip smoothly moves. Therefore, curving the chip in an adequate shape is likely to be difficult. In such a case, it is likely that the chip is insufficiently curved and the chip becomes long more than necessary.

Patent Document 1: Japanese Patent Laid-open Publication No. 2009-208216

SUMMARY OF THE INVENTION

A cutting insert according to one aspect of the present invention includes a polygonal columnar shape, and includes an upper surface, a lower surface and a side surface located between the upper surface and the lower surface, and a cutting edge is formed at an intersecting portion between the upper surface and the side surface. The upper surface includes a main portion which is made convex upward, a first projecting portion which projects from the main portion to a corner portion of the upper surface, and a pair of second projecting portions which each project from the first projecting portion to a periphery of the upper surface to interpose a region between a front end of the first projecting portion and the corner portion. Further, in the cutting insert according to the above aspect, each of upper ends of the pair of second projecting portions is spaced apart from the first projecting portion.

PREFERRED EMBODIMENTS FOR CARRYING OUT THE INVENTION

<Cutting Insert>

Figure 1:
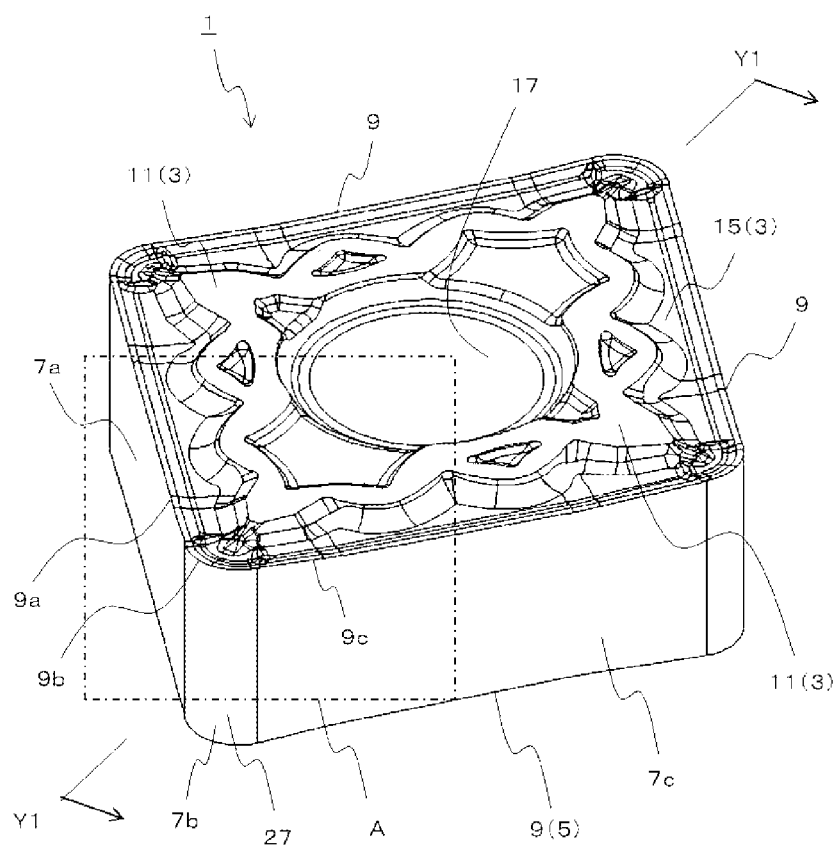
FIG. 1 shows a perspective view showing a cutting insert according to a first embodiment of the present invention.

A cutting insert according to one embodiment will be described in detail using the drawings below. Meanwhile, each drawing referred to below simplifies only main members required to explain the present invention among components according to the embodiment for ease of description. Hence, the cutting insert according to the present invention may have arbitrary components which are not shown in each drawing referred to in the present description. Further, the dimensions of the members in each drawing do not exactly reflect dimensions of actual components and dimension ratios and the like of each member.

As shown in FIGS. 1 to 9, a cutting insert 1 according to the present embodiment has an upper surface 3 and a lower surface 5 whose shapes are square shapes when seen from a plan view and, more specifically, diamond shapes. More specifically, the top surface 3 and the lower surface 5 are not squares, strictly speaking. Each corner portion which is an intersection of each side which forms a square is a curved corner portion.

Further, four side surfaces 7 connected to the upper surface 3 and the lower surface 5, respectively, are provided between the upper surface 3 and the lower surface 5. The side surface 7 includes a flat portion which is positioned between each side of the upper surface 3 and the lower surface 5 forming a square, and a curved surface portion which is positioned between a curved portion of the upper surface 3 and the lower surface 5. More specifically, the side surface 7 includes a flat first side surface 7a, a corner side surface 7b of a curved surface and a flat second side surface 7c.

The upper surface 3 and the lower surface 5 have substantially same shapes which overlap each other when seen from a plan view. Hence, the four side surfaces 7 positioned between the upper surface 3 and the lower surface 5 are formed vertically with respect to the upper surface 3 and the lower surface 5. These upper surface 3, lower surface 5 and side surfaces 7 form the cutting insert 1 into a polygonal columnar shape, and, more specifically, a quadrangular prism shape.

Further, cutting edges 9 are formed at an intersecting portion between the upper surface 3 and the side surface 7, and at an intersecting portion between the lower surface 5 and the side surface 7. That is, the cutting insert 1 according to the present embodiment is a so-called negative-type cutting insert 1 which has the cutting edges 9 formed at the intersecting portion between the upper surface 3 and the side surface 7 and, in addition, the intersecting portion between the lower surface 5 and the side surface 7. In addition, the cutting insert 1 may be a so-called positive-type cutting insert 1 which has the cutting edge 9 formed only at the intersecting portion between the upper surface 3 and the side surface 7.

The cutting insert 1 according to the present embodiment is the negative-type, and the lower surface 5 of the cutting insert 1 according to the present embodiment employs the same configuration as that of the upper surface 3 which is not shown in particular. The negative-type cutting insert 1 can be vertically turned upside down and used.

That is, when the lower surface 5 of the cutting insert 1 is attached as a seating surface to a holder 103, the cutting edge 9 formed at the intersecting portion between the upper surface 3 and the side surface 7 of the cutting insert 1 can be used for cutting process. Further, when the upper surface 3 of the cutting insert 1 is attached as a seating surface to the holder 103 by turning the cutting insert 1 upside down, the cutting edge 9 formed at the intersecting portion between the lower surface 5 and the side surface 7 of the cutting insert 1 can be used for cutting process.

As to the cutting edge 9, a first cutting edge 9a is formed at an intersecting portion between the upper surface 3 and the first side surface 7a, a corner cutting edge 9b is formed at an intersecting portion between the upper surface 3 and the corner side surface 7b, and a second cutting edge 9c is formed at an intersecting portion between the upper surface 3 and the second side surface 7c.

A height of the cutting edge 9 from the lower surface 5 may be fixed. However, the cutting edge 9 according to the present embodiment is configured such that portions of the first cutting edge 9a and the second cutting edge 9c adjacent to the corner cutting edge 9b are inclined toward the lower surface as being apart from a corner portion 27. The portions of the first cutting edge 9a and the second cutting edge 9c adjacent to the corner cutting edge 9b are used for high depth cut. However, this configuration can reduce a cutting resistance at this portion.

A longitudinal direction width of the upper surface 3 of the diamond shape in the cutting insert 1 according to the present embodiment is set to, for example, about 15 to 25 mm. Further, a width in a direction vertical to the longitudinal direction is set to about 10 to 22 mm. The size of the lower surface 5 of the diamond shape is set according to the size of the above upper surface 3. The thickness of the cutting insert 1 is set to, for example, 3 to 7 mm.

In this regard, the thickness means a vertical direction width from a portion at the uppermost position of the upper surface 3 to a portion at the lowermost position of the lower surface 5 when the cutting insert 1 is seen from the side view. At, for example, an upper end of the upper surface 3 and a lower end of the lower surface 5 in the cutting insert 1 according to the present embodiment, flat surfaces which are seating surfaces to which the holder 103 is attached are formed. Vertical direction widths of these flat surfaces are the thickness of the cutting insert 1.

A material of the cutting insert 1 is, for example, cemented carbide or cermet. A composition of cemented carbide includes, for example, WC—Co produced by adding cobalt (Co) powders to tungsten carbide (WC) and sintering the resultant material, WC—TiC—Co produced by doping WC—Co with titanium carbide (TiC) and WC—TiC—TaC—Co produced by doping WC—TiC—Co with tantalum carbide (TaC). Further, cermet is a sintered composite material produced by mixing metal in ceramic components, and more specifically, titanium compounds whose main component is titanium carbide (TiC) or titanium nitride (TiN).

The surface of the cutting insert 1 may be coated by a coating using a chemical vapor deposition (CVD) method or a physical vapor deposition (PVD) method. A composition of the coating includes, for example, titanium carbide (TiC), titanium nitride (TiN), titanium carbonitride (TiCN), alumina ($Al_2O_3$) and the like.

The upper surface 3 of the cutting insert 1 according to the present embodiment includes a main portion 11, a land portion 13 and breaker groove 15. The main portion 11 has a shape which is made convex upward, and is positioned so as to surround a through hole 17 as described below. The land portion 13 is formed at a periphery of the upper surface 3 so as to surround the main portion 11. That is, the cutting edge 9 is formed at the intersecting portion between the land portion 13 and the side surface 7.

Further, the breaker groove 15 is formed between the main portion 11 and the land portion 13. Heights of the main portion 11 and the land portion 13 from the lower surface 5 are positioned higher than heights of bottom surface of the breaker groove 15 from the lower surface 5. Further, the height of the main portion 11 from the lower surface 5 is higher than the height of the land portion 13 from the lower surface 5.

A rake angle of a region of the breaker groove 15 along the cutting edge 9 is maximum near the corner portion 27 for the purpose of raking a chip in a high depth cut region and curing the chip, and for the purpose of reducing a cutting resistance. Further, an angle is relatively small compared to the angle of the above portion to maintain strengths of a portion corresponding to the corner portion 27 and a portion apart from the corner portion 27.

In addition, the above "height from the lower surface 5" means a vertical direction width from this flat surface when the lower surface 5 is the flat surface. Further, when the lower surface 5 includes concavities and convexities as in the cutting insert 1 according to the present embodiment, the "height from the lower surface 5" means a vertical direction width from the flat lower end surface which functions as the seating surface to which the holder 103 is to be attached.

Furthermore, the upper surface 3 includes first projecting portion 19 which projects from the main portion 11 toward the corner portions 27 of the upper surface 3, and pairs of second projecting portions 21 and 23 which each project from the first projecting portion 19 to the periphery of the upper surface 3. The heights of the first projecting 19 and the second projecting portions 21 and 23 from the lower surface 5 are lower than the height of the main portion 11 from the lower surface 5. A pair of second projecting portions 21 and 23 are located so as to interpose at least a front end portion 19a (also referred to simply as a front end portion 19a) of the first projecting portion 19, and a region between the front end of the first projecting portion 19 and the corner portion 27.

The cutting insert 1 includes these second projecting portions 21 and 23, and, when low depth cut and high feed process are performed, a pair of second projecting portions 21 and 23 process a chip. Consequently, it is possible to reduce clogging of the chip upon high feed process, and to control the chip without an increase in cutting resistance.

Further, a first feature of the cutting insert 1 according to the present embodiment is that a pair of the second projecting portions 21 and 23 do not simply project from the first projecting portion 19 toward the periphery of the upper surface 3, but the upper ends of the pair of the second projecting portions 21 and 23 are apart from the first projecting portion 19. That is, a concave portion 25 which is a recess is formed at a boundary between the first projecting potion 19 and the second projecting portions 21 and 23. More specifically, the concave portion 25 which is opened upward and in a direction orthogonal to a direction in which the second projecting portions 21 and 23 project is formed between the first projecting portion 19 and the second projecting portions 21 and 23.

Thus, the recess is formed between the first projecting portion 19 and the second projecting portions 21 and 23. Consequently, similar to, for example, high depth cut processing, a chip which gets on the second projecting portions 21 and 23 is raked into this recess and contacts the first projecting portion 19 and, consequently, the chip can be easily curved. Consequently, the chip is easily cut; as a result, the chip does not become excessively long. Therefore it is possible to eject the chip well.

The through hole 17 which penetrates from the center of the upper surface 3 to the center of the lower surface 5 is formed in the cutting insert 1 according to the present embodiment. The through hole 17 is provided to allow insertion of a bolt 105 to screw and fix the cutting insert 1 to the holder 103 of the cutting tool 101. In addition, a clamp structure may be adopted for a method of fixing the cutting insert 1 to the holder 103 instead of the above screwing and fixing method.

An upper end surface of the main portion 11 is a flat surface. When the upper surface 3 of the cutting insert 1 is attached as the seating surface to the holder 103 by turning the cutting insert 1 upside down, the upper end surface of the main portion 11 functions as the seating surface. The first projecting portion 19 projects from the main portion 11 to the corner portion 27 of the upper surface 3. A pair of second projecting portions 21 and 23 are located to interpose a region between the front end of the first projecting portion 19 and the corner portion 27.

In the cutting insert 1 according to the present embodiment, a pair of second projecting portions 21 and 23 are located to interpose a line connecting the front end of the first projecting portion 19 and the corner portion 27. A pair of second projecting portions 21 and 23 are located axisymmetric with respect to the above line as a center axis. The first projecting portion 19 and the second projecting portions 21 and 23 function as so-called breakers for chips.

The upper ends of a pair of the second projecting portions 21 and 23 can be configured to be positioned at the same height as that of the upper end of the first projecting portion 19. The height of the upper end of the first projecting portion 19, more specifically, the height from the lower surface 5, and the heights of the upper ends of the second projecting portions 21 and 23 are substantially the same. Consequently, it is possible to stably curve chips.

Further, when a chip contacts one of the second projecting portions 21 and 23 and moves toward a rear end portion 19b of the first projecting portion 19, it is possible to smoothly place the chip in contact with the rear end portion 19b. When the chip strongly contacts the rear end portion 19b of the first projecting portion 19, the chip is likely to be clogged at the rear end portion 19b as the starting point. When the chip is clogged at the rear end portion 19b as the starting point, the chip strongly contacts not only the rear end portion 19b of the first projecting portion 19 but also a front end portion 19a, the front end portion 19a is likely to be damaged. However, by smoothly placing the chip in contact with the rear end portion 19b, it is possible to reduce the likelihood that the chip strongly contacts the front end portion 19a. As a result, it is possible to reduce the likelihood that the front end portion 19a is damaged.

Meanwhile, when a chip contacts side surface of the first projecting portion 19 and the second projecting portions 21 and 23 upon high depth cut and low feed process, the upper end of the first projecting portion 19 and the upper ends of the second projecting portions 21 and 23 have the same heights. Consequently, it is possible to minimize variations of curves of chips at the first projecting portion 19 and the second projecting portions 21 and 23. Consequently, it is possible to stably curve chips.

In the cutting insert 1 according to the present embodiment, the front end surface 19a of the first projecting portion 19 has a flat surface shape inclined with respect to the lower surface 5, and a front end surface 11a of the main portion 11 has a concave curved surface shape inclined with respect to the lower surface 5. Upon low depth cut and low feed process, a chip contacts the side surfaces of the second projecting portions 21 and 23 and, in addition, the front end surface of the first projecting portion 19. The front end of the first projecting portion 19 is a flat inclined surface to stably curve chips whose thicknesses are relatively small and which are likely to deform.

Figure 5:
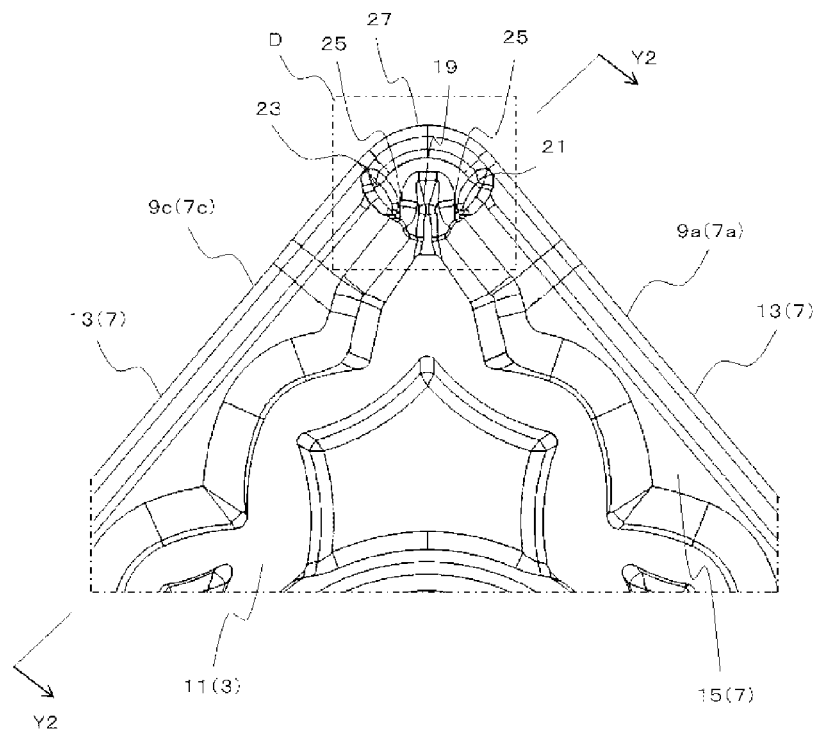
FIG. 5 shows an enlarged plan view enlarging a region B of the cutting insert shown in FIG. 2.

Further, a chip contacts the front end surface of the main portion 11 upon high feed process. Upon high feed process, the chip thickness is relatively large. In such a case, the front end of the main portion 11 is a concave inclined surface as shown in FIG. 5 to reduce a likelihood that the front end surface of the main portion 11 deforms, and to stably curve the chip.

When cutting process is performed using the cutting insert 1 according to the present embodiment and when, for example, low depth cut process is performed, a portion of the corner cutting edge 9b near the first cutting edge 9a or a portion of the corner cutting edge 9b near the second cutting edge 9c is mainly used. Which one of the portion of the corner cutting edge 9b near the first cutting edge 9a or the portion of the corner cutting edge 9b near the second cutting edge 9c is used is determined according to a direction in which a workpiece 201 is placed in contact.

When the workpiece 201 is placed in contact with the cutting insert 1 from a side of the first side surface 7a (the right sides in FIGS. 5 to 7), the portion of the corner cutting edge 9b near the first cutting edge 9a is used for cutting process. Further, when the workpiece 201 is placed in contact with the cutting insert 1 from a side of the second side surface 7c (the left sides in FIGS. 5 to 7), the portion of the corner cutting edge 9b near the second cutting edge 9c is used for cutting process.

When the portion of the corner cutting edge 9b near the first cutting edge 9a is mainly used for cutting process, a chip of the workpiece cut at this portion is placed in contact with the second projecting portion 23 which is relatively apart from the first cutting edge 9a among the second projecting portions 21 and 23, and is thereby deformed and cut.

A second feature of the cutting insert 1 according to the present embodiment is that the second projecting portion 21 projects toward the boundary between the first cutting edge 9a and the corner cutting edge 9b, the second projecting portion 23 projects toward the boundary between the second cutting edge 9c and the corner cutting edge 9b, and the height of the front end portion 19a is lower than the heights of the upper surfaces of the second projecting portions 21 and 23.

That is, in the cutting insert 1 according to the present embodiment, the second projecting portions 21 and 23 are not simply arranged symmetrically on a corner bisector but the second projecting portion 21 projects toward the boundary between the first cutting edge 9a and the corner cutting edge 9b and the second projecting portion 23 projects toward the second cutting edge 9c and the corner cutting edge 9b.

When the second projecting portion 23 does not project toward the above boundary but the second projecting portion 23 projects closer to the corner portion of the upper surface 3 than the boundary between the second cutting edge 9c and the corner cutting edge 9b, that is, projects toward the corner cutting edge 9b, it is possible to narrow the interval between the second projecting portion 23 and the first cutting edge 9a. However, in such a case, the angle formed between the direction in which the second projecting portion 23 projects and the first cutting edges 9a is large. Therefore, it is difficult to place a chip in contact with the second projecting portion 23 and to curve the chip well, and performance to cut chips lowers.

Meanwhile, in the cutting insert 1 according to the present embodiment, the second projecting portion 23 projects toward the above boundary. Consequently, the angle formed between the direction in which the second projecting portion 23 projects and the first cutting edge 9a becomes small, so that it is possible to cut chips well. More specifically, the second projecting portion 23 projects toward the above boundary, and the second projecting portion 23 is arranged in a state substantially vertical to a feeding direction of the cutting tool or to a rotation axis of a workpiece. Consequently, it is possible to cut chips well.

Figure 6:
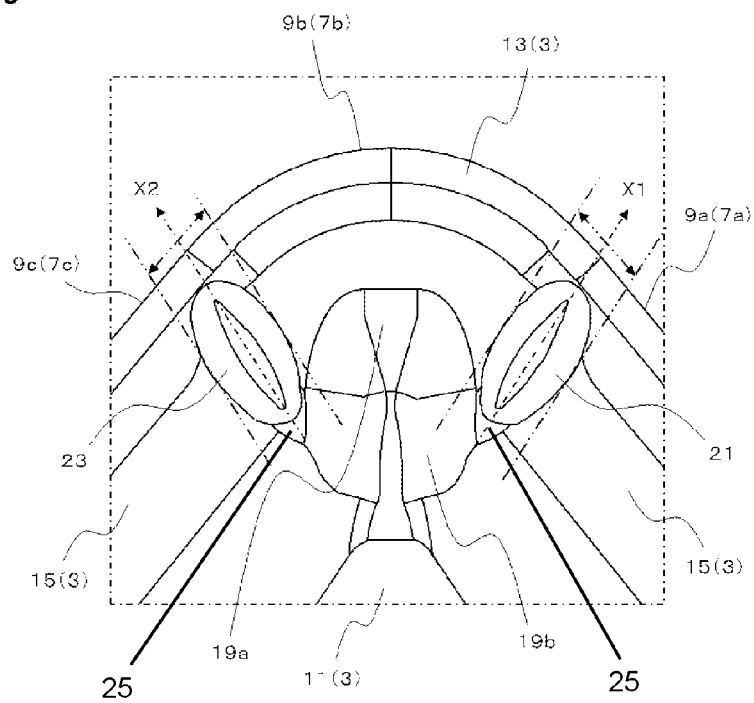
FIG. 6 shows an enlarged perspective view further enlarging a region D of the cutting insert shown in FIG. 5.

In addition, in the cutting insert 1 according to the present embodiment, that "the second projecting portion 21 projects toward the boundary between the first cutting edge 9a and the corner cutting edge 9b" means that a line which is parallel to a line X1 connecting the front end and the rear end of the second projecting portion 21 and which passes at least part of the second projecting portion 21 is located on the boundary between the first cutting edge 9a and the corner cutting edge 9b. More specifically, as shown in FIG. 6, the boundary between the first cutting edge 9a and the corner cutting edge 9b is located between two dashed-two dotted lines interposing the line X1. Hence, the line connecting the front end and the rear end of the second projecting portion 21 is not strictly limited to the line positioned on the above boundary.

Further, the second projecting portions 21 and 23 are located so as to interpose at least the front end portion 19a of the first projecting portion 19. In other words, the front end portion 19a of the first projecting portion 19 projects toward the corner cutting edge 9b between the second projecting portions 21 and 23.

Consequently, even when a corner curvature radius is increased, it is possible to first place a chip of a workpiece cut at the portion of the corner cutting edge 9b near the first cutting edge 9a, in contact with the front end portion 19a of the first projecting portion 19. More specifically, the front end portion 19a of the first projecting portion 19 is located closer to the first cutting edge 9a than the second projecting portion 23. Consequently, it is possible to place a chip in contact with the front end portion 19a of the first projecting portion 19 upon cutting process by way of low feed.

In addition, the height of the front end portion 19a is lower than the heights of the upper surfaces of the second projecting portions 21 and 23 and, when a feeding amount is increased, the chip gets over the front end portion 19a. In such a case, the chip contacts the second projecting portion 23. Consequently, even when the feeding amount is great, it is possible to stably deform chips. As described above, even when the corner curvature radius is increased, the cutting insert 1 according to the present embodiment can perform cutting process well upon low feed process and high feed process.

In addition, the height of the front end portion 19a and the heights of the upper surfaces of the second projecting portions 21 and 23 can be evaluated by calculating "heights from the lower surface 5" as described above. Further, the "upper surfaces" of the second projecting portions 21 and 23 mean the highest portions of the second projecting portions 21 and 23 from the lower surface 5, and do not necessarily need to be flat surfaces. In other words, the height of the upper surface of the first projecting portion 19 at the portion interposed between the second projecting portions 21 and 23 is lower than the heights of the upper ends at the highest positions of the second projecting portions 21 and 23.

The cutting insert 1 according to the present embodiment is suitably used for cutting process with a wide variety of feeding amounts upon low depth cut process of cutting the workpiece 201 in such a region of the corner cutting edge 9b. In addition, the cutting insert 1 according to the present embodiment is suitably used upon low depth cut process. However, naturally, use of the cutting insert 1 upon high depth cut process is not disturbed.

Further, a case has been described above where the portion of the corner cutting edge 9b near the first cutting edge 9a is mainly used for cutting process. However, when the portion of the corner cutting edge 9b near the second cutting edge 9c is mainly used for cutting process, a role of the second projecting portion 21 and a role of the second projecting portion 23 are reversed.

The first projecting portion 19 includes the front end portion 19a interposed between the second projecting portions 21 and 23, and a portion positioned closer to the rear end side than this front end portion 19a. Hereinafter, this portion will be referred to as the rear end portion 19b for ease of description. The upper surface of the front end portion 19a is a planar inclined surface. Further, the upper surface of the rear end portion 19b is an inclined surface of a concave curved surface. The upper surfaces of the front end portion 19a and the rear end portion 19b are inclined surfaces whose heights become lower toward the corner cutting edge 9b.

The front end portion 19a of the first projecting portion 19 mainly functions when a chip is placed in contact with the front end portion 19a upon low depth cut and low feed process and is deformed. The thickness of a chip is small upon low feed process, and, consequently, the chip is easily curved when contacting the front end portion 19a whose upper surface is the planar inclined surface. Further, when the cutting amount is great and the feeding amount is also great, a chip is likely to get over the front end portion 19a and contact the rear end portion 19b of the first projecting portion 19.

In such a case, the upper surface of the rear end portion 19b is an inclined surface of a concave curved surface. Consequently, when a chip moves along this inclined surface, it is possible to increase a contact area between the chip and the rear end portion 19b. Therefore, it is possible to stably put on a brake on the chips and, consequently, to efficiently cut the chips.

Further, in the cutting insert 1 according to the present embodiment, the width of the rear end portion 19b of the first projecting portion 19 in a direction orthogonal to the direction in which the first projecting portion 19 projects gradually becomes narrower from the rear end side to the front end side. In addition, the width of the front end portion 19a of the first projecting portion 19 in the direction orthogonal to the direction in which the first projecting portion 19 projects gradually becomes wider from the rear end side to the front end side. The front end side width of the front end portion 19a is relatively wide and, consequently, it is possible to have chips stably get on the upper surface of the front end portion 19a upon low depth cut process.

Further, the entire width of the front end portion 19a is not wide but the rear end side width of the front end portion 19a is relatively narrow. Consequently, it is possible to reduce an interval between the second projecting portions 21 and 23 so as not to become excessively large. That is, it is possible to reduce the interval between the first cutting edge 9a and the second projecting portion 23. Consequently, it is possible to reduce a distance which a chip cut by the corner cutting edge 9b takes to contact the second projecting portion 23 so as not to become excessively longer. Consequently, it is possible to stably deform chips when the chips are placed in contact with the second projecting portions 23.

The upper surface of the rear end portion 19b of the first projecting portion 19 is a concave curved surface as described above. Hence, when a chip is placed in contact with the rear end portion 19b, the chip is likely to apply a greater load to the rear end side than to the front end side of the upper surface of the rear end portion 19b. However, the rear end side width of the rear end portion 19b is relatively wide. Consequently, it is possible to increase a contact area with chips, on the rear end side of the rear end portion 19b to which a relatively great load is likely to be applied. Consequently, it is possible to distribute the load applied to the first projecting portion 19. As a result, it is possible to enhance durability of the rear end portion 19b of the first projecting portion 19.

Further, the entire width of the rear end portion 19b is not wide but the front end side width of the rear end portion 19b is relatively narrow. Consequently, it is possible to reduce an interval between the second projecting portions 21 and 23 so as not to become excessively large. Consequently, it is possible to stably deform chips when the chips are placed in contact with the second projecting portions 23 as described above.

Figure 7:
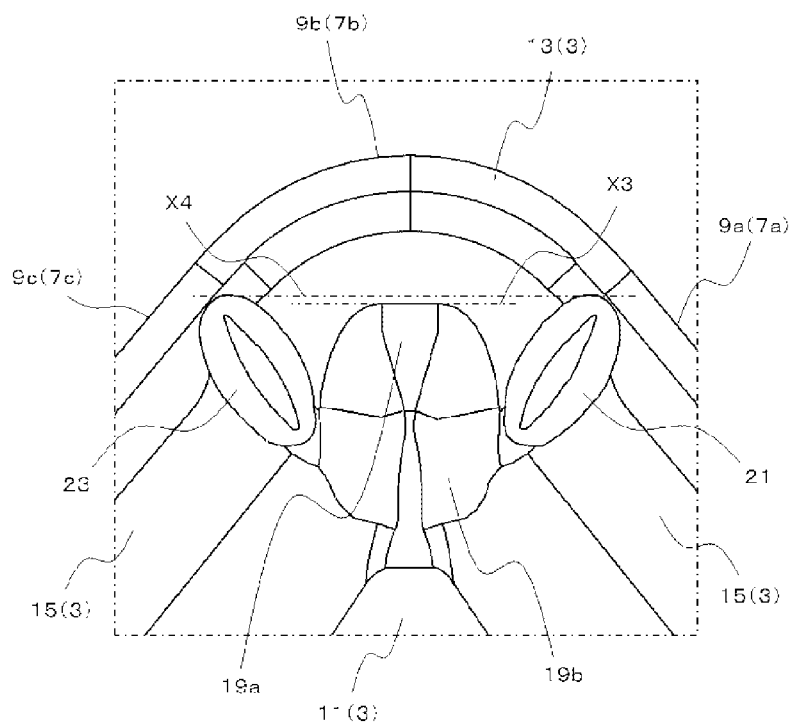
FIG. 7 shows an enlarged perspective view further enlarging the region D of the cutting insert shown in FIG. 5.
Figure 8:
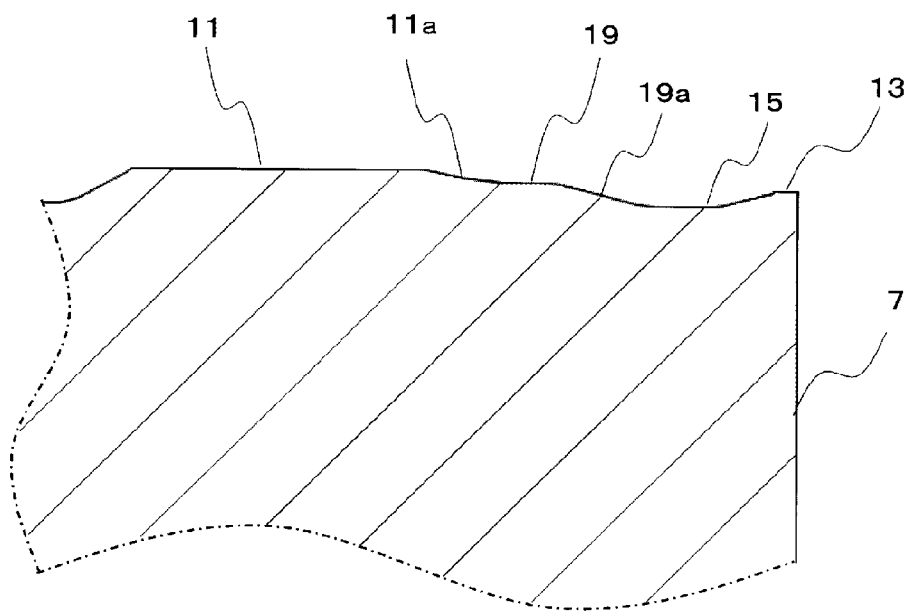
FIG. 8 shows an enlarged cross-sectional view enlarging a region including a first projecting portion in a cross section Y1-Y1 of the cutting insert shown in FIG. 1.
Figure 9:
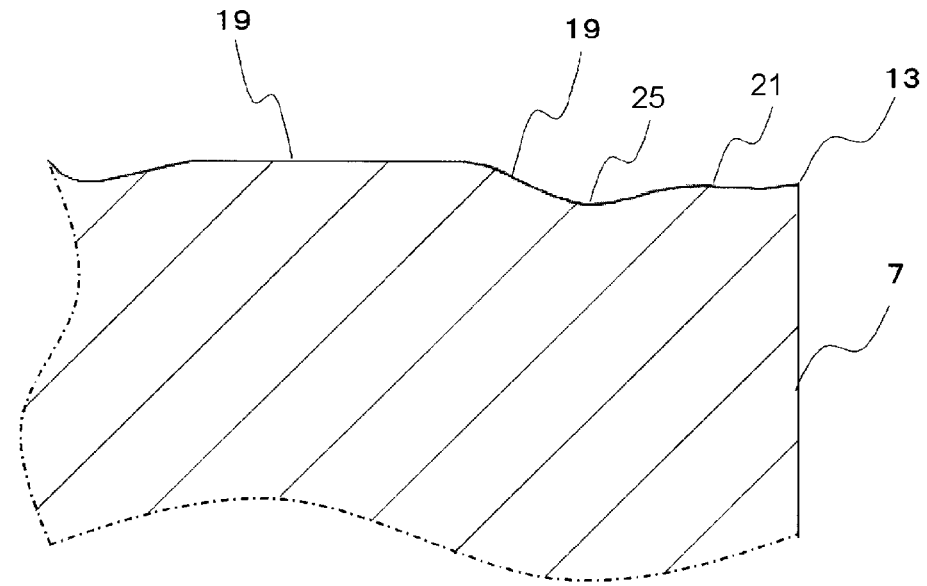
FIG. 9 shows an enlarged cross-sectional view enlarging a region including second projecting portion in a cross section Y2-Y2 of the cutting insert shown in FIG. 5.

Further, in the cutting insert 1 according to the present embodiment, the front end portions of the second portions 21 and 23 project more in a direction in which the first projecting portion 19 projects than the front end portion 19a of the first projecting portion 19. More specifically, as shown in FIG. 7, a line which is orthogonal to a direction in which the first projecting portion 19 projects and which is in contact with the front end of the first projecting portion 19 is a line X3. Further, a line which is orthogonal to the direction in which the first projecting portion 19 projects and which is in contact with the front ends of the second projecting portions 21 and 23 is a line X4.

In this case, the line X4 is parallel to the line X3, and the line X4 is located closer to the corner portion 27 in the direction in which the first projecting portion 19 projects than the line X3. Hence, a concave portion is formed in a region surrounded by the corner cutting edge 9b, the projecting portion 19 and the second projecting portions 21 and 23. The concave portion forms a part of the breaker groove 15. When this concave portion is formed, a chip which is in contact with the second projecting portion 23 can be easily deformed in this concave portion.

In the cutting insert 1 according to the present embodiment, the second projecting portions 21 and 23 each linearly project. In this regard, that the second projecting portions 21 and 23 linearly project means that, in case of, for example, the second projecting portions 23, each ridge connecting the front end and the rear end of the second projecting portion 23 is linearly formed. Consequently, the second projecting portion 23 does not need to have a linear shape, and may have an oval sphere or a droplet shape whose width at a center portion between the front end side and the rear end side is wide as shown in FIGS. 6 and 7.

The second projecting portions 21 and 23 in the cutting insert 1 according to the present embodiment has the upper surfaces which are convex curved surfaces and lower ends of the side surfaces which are concave curved surface. Consequently, an upper end side surface including the upper surface is shown as a convex curve in the cross section which is vertical to the lower surface 5 and includes the second projecting portion 23, and the lower end side surface continuing to the breaker groove 15 is shown as a concave curve.

When the feeding amount is great, a chip gets over the front end portion 19a of the first projecting portion 19 and contacts the surfaces of the second projecting portions 21 and 23. However, even in such a case, it is possible to easily curl a chip which contacts the second projecting portions 21 and 23 through the surfaces which are lower end side concave curved surfaces continuing to the breaker groove 15 in the second projecting portion 23.

Further, the upper surfaces of the second projecting portions 21 and 23 are convex curved surfaces, so that the feeding amount further increases and it is possible to have chips smoothly move from the second projecting portions 21 and 23 to the rear end portion 19b of the first projecting portion 19. Consequently, it is possible to stably deform the chips in the upper surface of the rear end portion 19b.

Further, in the cutting insert 1 according to the present embodiment, the direction in which the second projecting portion 23 projects is nearly parallel to the second side surface 7c. When the second projecting portion 23 is formed in this way, chips can be stably curved by the second projecting portion 23 upon process with the feeding amount at which the chips are placed in contact with the second projecting portion 23. Consequently, the chips are easily cut to an adequate length; as a result, the chips do not become excessively long.

Further, the direction in which the second projecting portion 21 projects is nearly parallel to the first side surface 7a. When the second projecting portion 21 is formed in this way, chip lengths can be easily controlled upon cutting process of placing chips in contact with the second projecting portion 21 by placing a workpiece in contact with the cutting insert 1 from a direction with the left and the right reversed. More specifically, chips can be stably curved by the second projecting portion 21 upon process with the feeding amount at which the chips are placed in contact with the second projecting portion 21. Consequently, the chips are easily cut to an adequate length; as a result, the chips do not become excessively long.

Exemplary sizes of the first projecting portion 19 and the second projecting portions 21 and 23 are as follows. As shown in FIG. 5, the length of the rear end portion 19b of the first projecting portion 19 indicated by the direction in which the first projecting portion 19 projects (the vertical direction in FIG. 5) can be set to 0.4 to 1 mm, and the width of the rear end portion 19b indicated by the direction orthogonal to the above direction can be set to 0.3 to 0.6 mm.

Further, the length of the front end portion 19a of the first projecting portion 19 indicated by the direction in which the first projecting portion 19 projects (the vertical direction in FIG. 5) can be set to 0.3 to 0.7 mm, and the width of the front end portion 19a indicated by the direction orthogonal to the above direction can be set to 0.4 to 0.7 mm. Furthermore, the length of each second projecting portion 21 indicated by the direction in which the second projecting portion 21 projects can be set to 0.3 to 0.8 mm, and the width of the second projecting portion 21 indicated by the direction orthogonal to the above direction can be set to 0.3 to 0.6 mm. Still further, the length of each third projecting portion 23 indicated by the direction in which the third projecting portion 23 projects can be set to 0.3 to 0.8 mm, and the width of the third projecting portion 23 indicated by the direction orthogonal to the above direction can be set to 0.3 to 0.6 mm.

Figure 2:
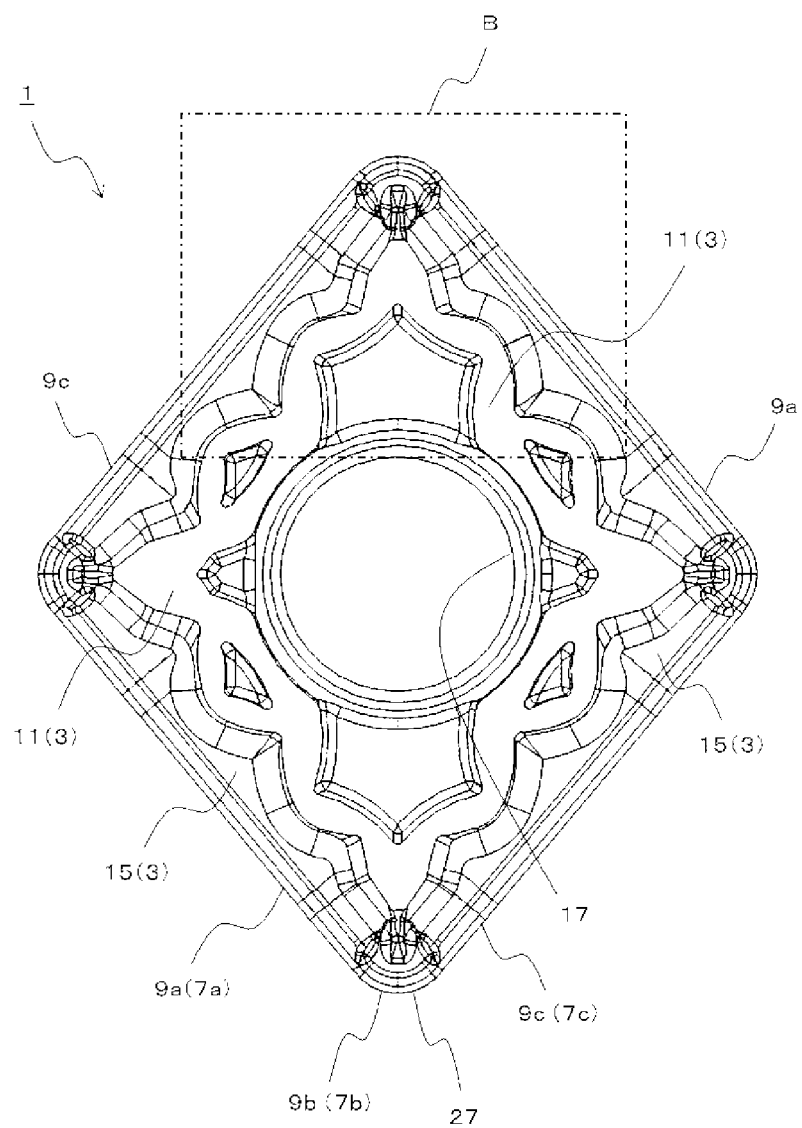
FIG. 2 shows a plan view of the cutting insert shown in FIG. 1.
Figure 3:
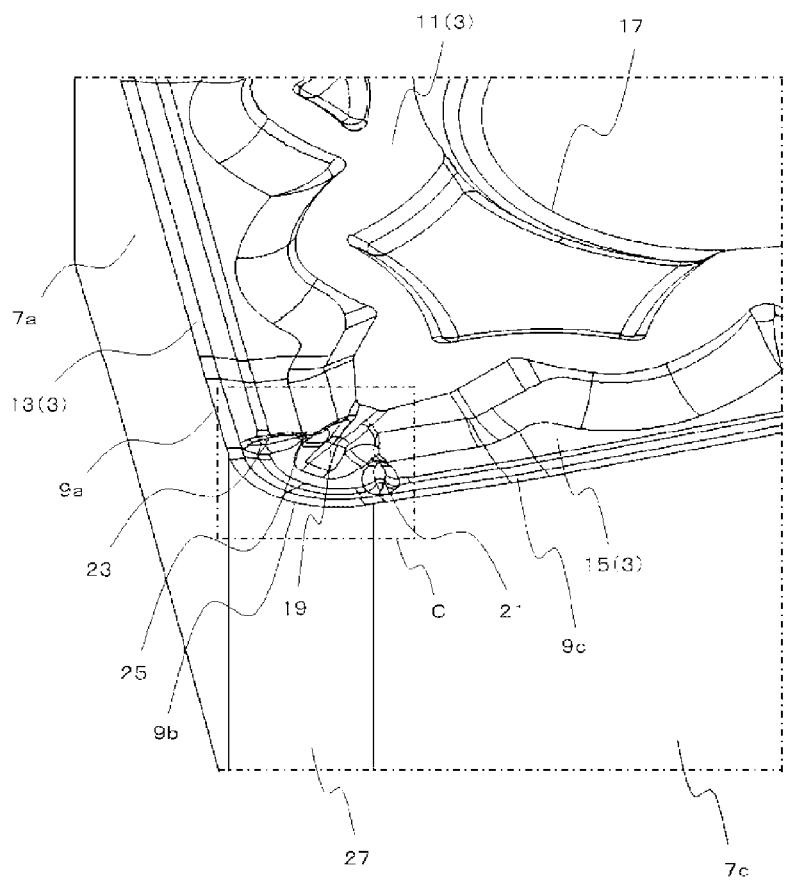
FIG. 3 shows an enlarged perspective view enlarging a region A of the cutting insert shown in FIG. 1.
Figure 4:
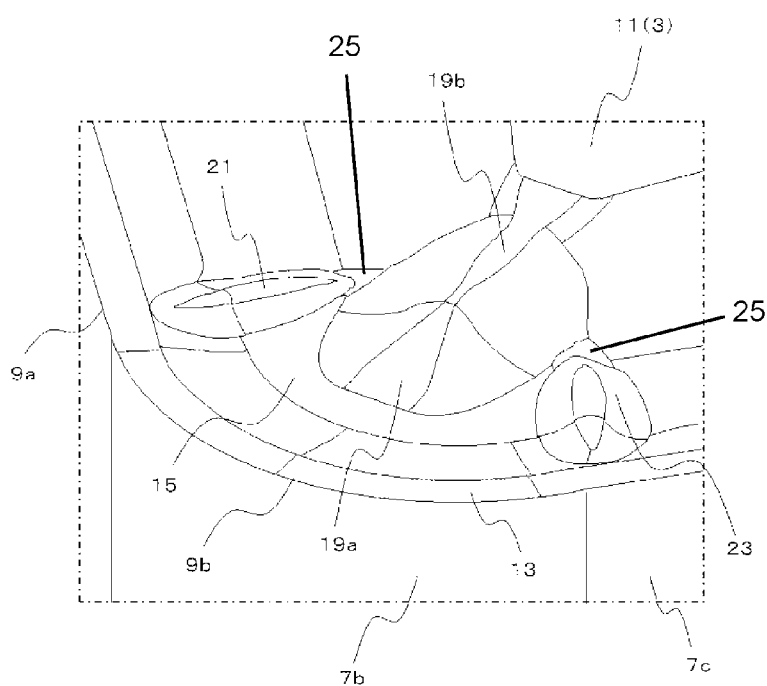
FIG. 4 shows an enlarged perspective view further enlarging a region C of the cutting insert shown in FIG. 3.

In addition, as shown in FIG. 2, the cutting insert 1 according to the present embodiment has the upper surface 3 whose shape is a square shape of a diamond shape when seen from a plan view and is not limited to this mode. For example, the shape of the upper surface 3 may be a polygonal shape such as a triangular shape, a pentagonal shape, a hexagonal shape or an octagonal shape when seen from a plan view.

Further, that the shape is a square shape when seen from a plan view does not demand a strict square shape. The main portions at the outer periphery of the upper surface 3 may be formed with four sides and the corner portion 27 may have partial curved shape.

<Cutting Tool>

Next, a cutting tool 101 according to an embodiment of the present invention will be described with reference to the drawings.

Figure 10:
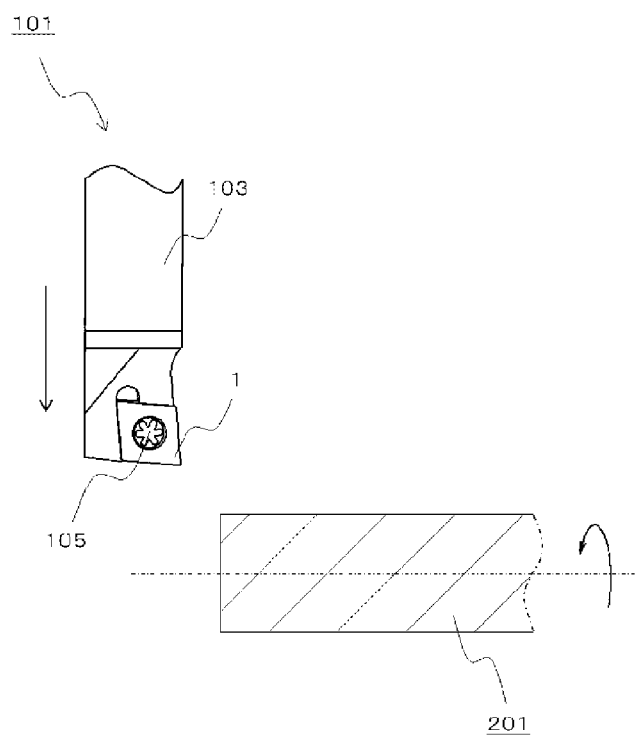
FIG. 10 shows a process view of a cutting method according to an embodiment of the present invention.
Figure 11:
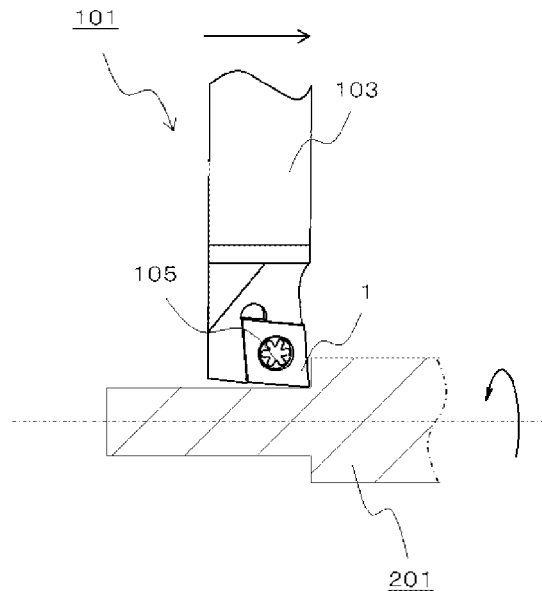
FIG. 11 shows a process view of the cutting method according to the embodiment of the present invention.
Figure 12:
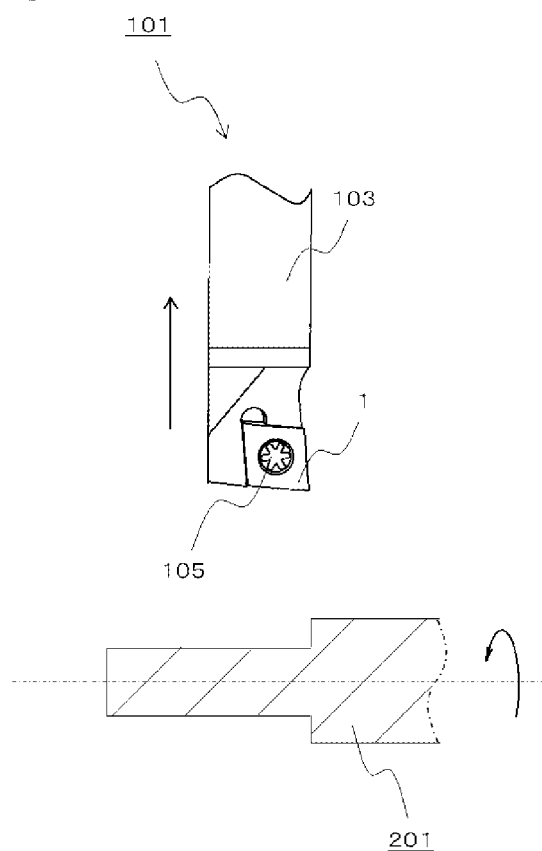
FIG. 12 shows a process view of the cutting method according to the embodiment of the present invention.

As shown in FIGS. 10 to 12, the cutting tool 101 according to the present embodiment has the cutting insert 1 represented in the above embodiment, and the holder 103 to which the cutting insert 1 is attached. The holder 103 according to the present embodiment has at one end portion a bar shape, and has an insert pocket to which the cutting insert 1 is attached. The cutting insert 1 is attached such that the cutting edge 9 projects outward compared to the outer periphery of the holder 103.

In the present embodiment, the cutting insert 1 is fixed to the insert pocket by the bolt 105. That is, by inserting the bolt 105 in the through hole 17 of the cutting insert 1, inserting the front end of this bolt 105 in a screw hole (not shown) formed in the insert pocket and screwing screw portions, the cutting insert 1 is attached to the holder 103.

Steel or cast iron can be used for the holder 103. Particularly, touch steel among these members is preferably used.

<Method of Manufacturing Machined Product>

Next, the method of manufacturing a machined product by cutting the workpiece 201 according to one embodiment of the present invention will be described with reference to the drawings.

The manufacturing method according to the present embodiment has the following processes. That is, the manufacturing method includes, as shown in FIG. 10, process (1) of placing the cutting tool 101 represented in the above embodiment relatively close to the workpiece 201 in a state where the workpiece 201 is rotated, as shown in FIG. 11, process (2) of placing at least the corner cutting edge 13 of the cutting edge 9 of the cutting tool 101 in contact with the rotating workpiece 201, and, as shown in FIG. 12, process (3) of separating the cutting tool 101 from the workpiece 201.

According to the method of manufacturing the machined product according to the present embodiment, the cutting insert 1 has the first projecting portion 19 and the second projecting portions 21 and 23 employing the above characteristic configuration. Consequently, it is possible to support cutting process with a wide variety of feeding amounts.

In addition, in FIG. 10, the workpiece 201 is rotated in a state where the rotation axis is fixed, and the cutting tool 101 is placed close to the workpiece 201. Further, in FIG. 11, in a state where the workpiece 201 is rotated, cutting process is performed by placing the cutting tool 101 in contact with the workpiece 201. Furthermore, in FIG. 12, the workpiece 201 is rotated in a state where the rotation axis is fixed, and the cutting tool 101 is placed away from the workpiece 201. In addition, according to the cutting method according to the present embodiment, the workpiece 201 is rotated in a state where the rotation axis is fixed and the cutting tool 101 is moved in each process. Naturally, the cutting method is not limited to this mode.

For example, in the process (1), the workpiece 201 may be placed close to the cutting tool 101. Further, in the process (3), the workpiece 201 may be placed away from the cutting tool 101. To continue cutting process, process of holding a state where the workpiece 201 is rotated, and placing the corner cutting edge 9b of the cutting insert 1 in contact with different portions of the workpiece 201 only needs to be repeated. When the corner cutting edge 9b in use is worn away, the corner cutting edge 9b which is not used can be used by rotating the cutting insert 1 by 180 degrees with respect to the center axis of the through hole 17 or turning the cutting insert 1 upside down.

In addition, typical examples of materials of the workpiece 201 are carbon steel, steel alloy, stainless steel, cast iron or non-ferrous metal.

REFERENCE SIGNS LIST

1: Cutting insert
3: Upper surface
5: Lower surface
7: Side surface
7a: First side surface
7b: Corner surface
7c: Second side surface
9: Cutting blade
9a: First cutting edge
9b: Corner cutting edge
9c: Second cutting edge
11: Main portion
13: Land portion
15: Breaker groove
17: Through hole
19: First projecting portion
19a: Front end portion
19b: Rear end portion
21: Second projecting portion
23: Third projecting portion
25: Concave portion
27: Corner portion
101: Cutting tool
103: Holder
105: Bolt
201: Workpiece

The invention claimed is:

1. A cutting insert, comprising:
an upper surface, a lower surface and a side surface located between the upper surface and the lower surface, and a polygonal plate shape in which a cutting edge is formed at an intersecting portion between the upper surface and the side surface, wherein
the upper surface comprises a main portion of a convex shape which has a flat upper end surface, a first projecting portion which projects from the main portion to a corner portion of the upper surface, and a pair of second projecting portions which each project from the first projecting portion to a periphery of the upper surface to interpose a region between a front end of the first projecting portion and the corner portion,
each of upper ends of the pair of second projecting portions is spaced apart from the first projecting portion,
the first projecting portion connects to the main portion and the pair of second projecting portions are apart from the main portion,
a rear end of the first projecting portion is closer to the main portion than a rear end of the second projecting portion in a direction of a bisector of the corner portion of the upper surface in a top view,
the first projection portion comprises a front end portion interposed between the pair of the second projecting portions and a rear end portion positioned closer to the main portion than the front end portion,
a width of the front end portion in a direction orthogonal to a direction in which the first projecting portion projects becomes wider from the rear end to the front end, and
a width of the rear end portion in a direction orthogonal to a direction in which the first projecting portion projects becomes narrower from the rear end to the front end.

2. The cutting insert according to claim 1, wherein heights of the upper ends of the pair of the second projecting portions are the same as a height of an upper end of the first projecting portion.

3. The cutting insert according to claim 1, wherein
a front end of the first projecting portion is a flat inclined surface, and
a front end of the main portion is an inclined surface of a concave shape.

4. The cutting insert according to claim 1, wherein a direction in which one of the pair of the second projecting portions projects is parallel to the cutting edge at a portion located in a direction in which the other one of the pair of the second projecting portions projects.

5. The cutting insert according to claim 1, wherein
the side surface sequentially comprises a first side surface, a corner side surface and a second side surface,
the cutting edge comprises a first cutting edge which is formed at an intersecting portion between the upper surface and the first side surface, a corner cutting edge formed at an intersecting portion between the upper surface and the corner side surface, and a second cutting edge which is formed at an intersecting portion between the upper surface and the second side surface,
one of the pair of second projecting portions projects toward a boundary between the first cutting edge and the corner cutting edge, and the other one of the pair of second projecting portions projects toward a boundary between the second cutting edge and the corner cutting edge, and
a height of a front end portion of the first projecting portion is lower than heights of upper surfaces of the pair of second projecting portions.

6. The cutting insert according to claim 5, wherein front end portions of the pair of second projecting portions project more in a direction in which the first projecting portion projects than a front end portion of the first projecting portion.

7. The cutting insert according to claim 5, wherein the upper surface of the second projecting portion comprises a convex curved surface shape.

8. A cutting tool, comprising:
a cutting insert according to claim 1; and
a holder to attach the cutting insert thereto.

9. A method of manufacturing a machined product, comprising:
rotating a workpiece;
bringing the cutting edge of the cutting tool according to claim 8 into contact with the workpiece being rotated; and
separating the cutting tool from the workpiece.

10. The cutting insert according to claim 1, wherein the first projecting portion connects to the flat upper end surface of the main portion.

11. The cutting insert according to claim 1, further comprising:
a concave portion which is a recess and is located between the first projecting portion and the second projecting portion.

12. The cutting insert according to claim 11, wherein the concave portion is opened upward and in a direction orthogonal to a direction in which the second projecting portion projects.

13. The cutting insert according to claim 1, wherein the first projecting portion comprises a front end which is located between the pair of second projecting portions and has a straight edge perpendicular to a bisector of the corner portion of the upper surface in a top view.

14. The cutting insert according to claim 1, wherein the upper surface further comprises a breaker groove located between the cutting edge and the main portion, the breaker groove comprises an inclined surface inclined downward from the cutting edge to the main portion and a bottom surface located between the inclined surface and the main portion, a front end of the first projection is located in the bottom surface, and the second projection is located across the inclined surface and the bottom surface.

15. The cutting insert according to claim 14, wherein a front end of the second projecting portion is located in the inclined surface and the rear end of the second projecting portion is located in the bottom surface.

16. The cutting insert according to claim 14, wherein the bottom surface is a flat surface parallel to the lower surface.

17. The cutting insert according to claim 1, wherein the second projecting portion has an oval sphere.

18. The cutting insert according to claim 1, wherein the upper surface further comprises a concave portion which is a curved recess and is located between the first projecting portion and the second projecting portion.

* * * * *